United States Patent Office 3,519,695
Patented July 7, 1970

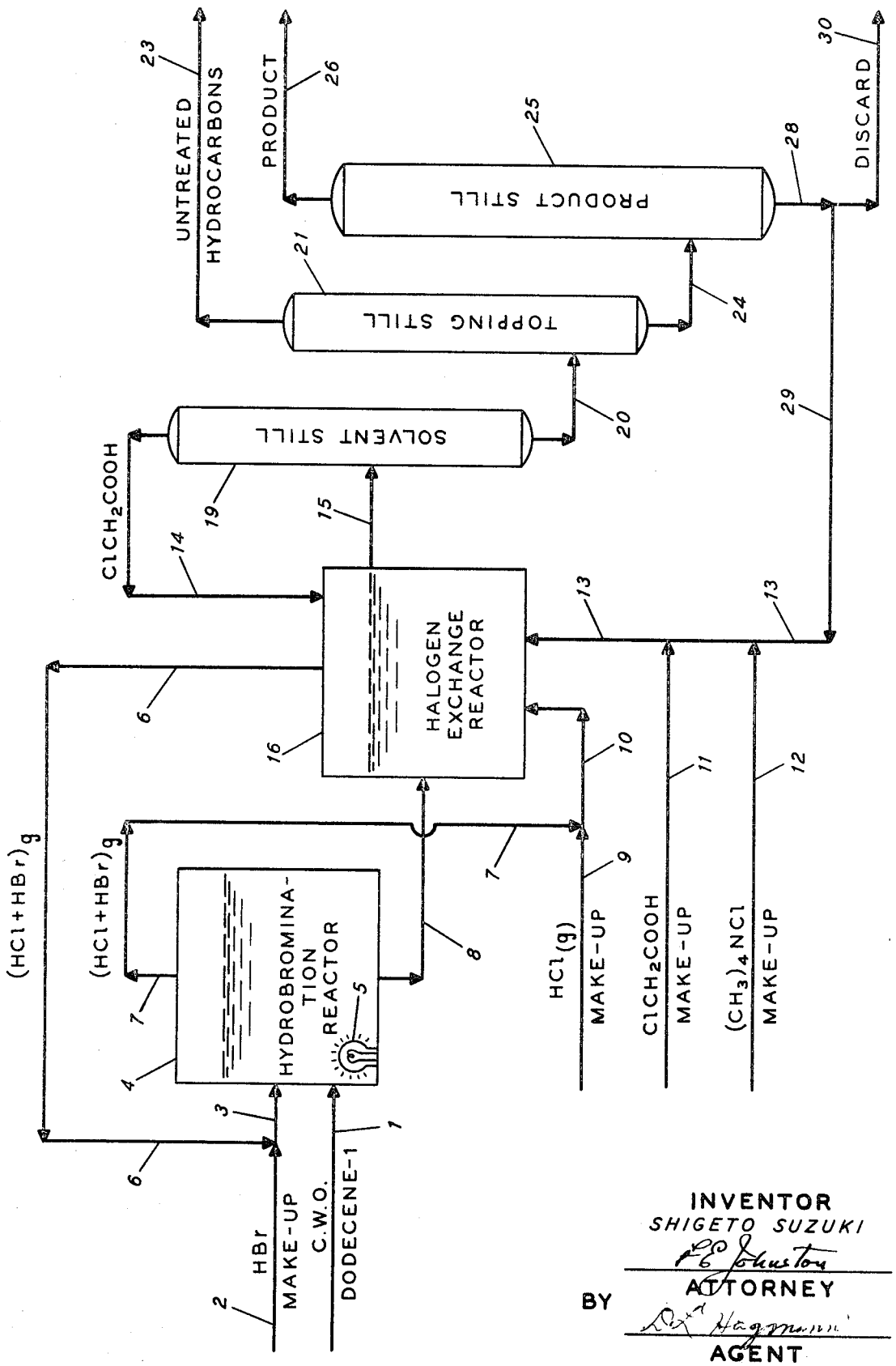

3,519,695
PRIMARY ALKYL CHLORIDES FROM α-OLEFINS
Shigeto Suzuki, San Francisco, Calif., assignor to Chevron Research Company, San Francisco, Calif., a corporation of Delaware
Filed Jan. 29, 1965, Ser. No. 428,985
Int. Cl. C07c 17/08, 17/20
U.S. Cl. 260—658                 6 Claims

ABSTRACT OF THE DISCLOSURE

Primary alkyl chlorides are produced from 1-alkenes in a continuous process which includes a catalyzed displacement of hydrogen bromide by hydrogen chloride and the selective free radical catalyzed addition of hydrogen bromide present in a mixture of hydrogen bromide and hydrogen chloride to the 1-alkene. The displacement is carried out in an organic acid solvent and is catalyzed by lithium or quaternary ammonium chlorides or bromides. Anhydrous conditions are required.

---

This invention relates to a continuous process for the production of primary alkyl chlorides from $C_6$–$C_{20}$ cracked wax α-olefins and hydrogen chloride. More particularly, it relates to a production process for primary alkyl chlorides from α-olefinic hydrocarbons and hydrogen chloride by a catalyzed regenerative displacement and recycle of anhydrous hydrogen bromide.

Primary alkyl chlorides are highly useful in chemical syntheses and are employed in many ways in the chemical industry. No satisfactory means for their production from cracked wax α-olefins, and hydrogen chloride is known in the art although the olefins are readily and economically available from petroleum processing, and hydrogen chloride is relatively inexpensive.

It has now been found that higher primary alkyl chlorides, that is of the molecular weight range from about $C_6$ and up, can be efficiently prepared from hydrogen chloride and cracked petroleum wax α-olefins in a staged continuous process, the first of which is a selective free-radical catalyzed addition of hydrogen bromide present in a gaseous hydrogen bromide-hydrogen chloride mixture to the desired cracked wax α-olefin feed.

In the second stage, a catalyzed displacement of hydrogen bromide by hydrogen chloride from the first stage reaction product mixture is effected in an organic carboxylic acid medium at elevated temperatures. A temperature of at least 130° C. is required, and the presence of lithium chloride or a quaternary ammonium chloride is necessary to promote the displacement. The corresponding bromides are also useful and are converted to chlorides as the exchange proceeds.

In the final process stage the organic acid medium is separated by distillation from the alkyl chloride produced and recycled to the process.

The process feed streams must be substantially free of water. Any appreciable amount of water which might be introduced at almost any point in the process ultimately is found concentrated in the halogen exchange reactor and may also be found in the gas recycle stream. Water inhibits, and in gross amounts prevents, the free-radical catalyzed addition to the olefin feed of the hydrogen bromide present in the gaseous recycle mixture.

In the absence of the organic acid medium no effective hydrogen bromide displacement by hydrogen chloride in the second stage occurs. Similarly, in the absence of lithium or quaternary ammonium chloride catalyst, although organic acid is present, no appreciable hydrogen bromide displacement takes place in the second stage. It appears that effective catalytic displacement is only possible in the presence of both organic carboxylic acid and the aforementioned catalysts.

The invention will be more clearly understood from the following detailed description read in conjunction with the accompanying drawing which is a diagrammatic illustration showing the flow of material through the apparatus. The vessels and lines used are corrosion resistant and preferably are corrosion resistant steel. Glass, glass-lined metal reactors as well as acid resistant ceramic and the like reaction vessels are also useful.

Start-up of the subject continuous process is, of course, a somewhat singular event and is accomplished in general incrementally or by introduction of approximations of the steady state charges to the reactors 4 and 16. In a preferred start-up procedure 500 lbs. (~75 gal.) of dry dodecene-1 olefin is charged and converted to n-dodecyl bromide in a 150 gallon vessel, reactor 4, by introducing 66 lbs. of dry hydrogen bromide through lines 2 and 3 during a half-hour interval into the dodecene maintained at about 32° C. During the introduction of the hydrogen bromide the resulting mixture is irradiated by a suitable ultra-violet light source, lamp 5, i.e. at a rate of 1000 watts per hour. After a half-hour the entire reaction product mixture is transferred to reactor 16, a 1000 gallon vessel to which is added 5,000 lbs. of chloroacetic acid solvent and 200 lbs. of tetramethyl ammonium chloride. A second 500 lb. charge of olefin is then charged to reactor 4, and dry hydrogen chloride is introduced into the charge in reactor 16 which together with its contents is maintained at 150° C. The effluent gas stream from reactor 16 containing hydrogen bromide and hydrogen chloride is recycled to reactor 4 via lines 6 and 3. After a one-half hour residence time the second reactor 4 charge is transferred to reactor 16, a third 500 lb. charge of olefin is introduced via line 1 to reactor 4, and the continuous process is initiated.

In the continuous operation after the above start up, feed α-olefin is charged via line 1 into reactor 4 at a rate of 1,000 lbs. per hour (residence time in reactor 4 is 0.5 hour) while via lines 2 and 3, 15 lbs. per hour of make-up dry hydrogen bromide is introduced into reactor 4 and via lines 6 and 3 a recycle gaseous mixture of hydrogen chloride-hydrogen bromide is also introduced into the olefin in reactor 4 at the rate of 266 and 528 lbs. per hour, respectively. Via lines 7 and 10 the effluent gas mixture, hydrogen chloride and hydrogen bromide, 266 and 51 lbs. per hour, respectively, is passed into the contents of reactor 16 which is also receiving via line 8, 1492 lbs. per hour of reactor 4 reaction product as well as 215 lbs. per hour of hydrogen chloride via lines 9 and 10, and via lines 29 and 13, 1283 lbs. per hour of recycle bottoms from product still 25. Incidental make-up amounts of organic acid solvent and catalyst, 2 and 20 lbs. per hour, respectively, are added to reactor 16 via lines 11 and 12, respectively. Residence time in reactor 16 is one hour; temperature is 150° C.; and pressure is atmospheric. Crude product mixture is passed from reactor 16 via line 15 at a rate of 7433 lbs. per hour into solvent still 19 from which as an overhead stream via line 14, 4898 lbs. per hour of chloroacetic acid is recycled to reactor 16 and as a bottoms fraction via line 20, 2535 lbs. per hour of solvent reduced crude product is passed to topping still 21.

Unreacted hydrocarbon, mainly saturated aliphatic impurities, is vented as an overhead stream from topping still 21 at a rate of 29 lbs. per hour. The bottoms fraction, 2506 lbs. per hour, is passed via line 24 to product still 25. A typical line 24 stream composition as obtained from $C_{12}$ cracked wax olefin follows:

| | Weight percent |
|---|---|
| n-Dodecyl bromide | 15 |
| 1,12-dibromododecane | 1 |
| n-Dodecyl chloride | 43 |
| 1,12-dichlorododecane | 27 |
| 1-chloro-12-bromododecane | 1 |
| Tar | 5 |
| Tetramethyl ammonium chloride | 8 |

The n-dodecyl chloride resulting from the process is recovered as the overhead fraction, 1081 lbs. per hour, via lines 26. The bottoms fraction, 1425 lbs. per hour, is split into a recycle stream (1283 lbs. per hour to reactor 16 via lines 28, 29 and 13) and a discharge stream (142 lbs. per hour via line 30) which may be further processed to recover catalyst values and 1,12 - dichlorododecane values. The latter result from the presence of 1,11-dodecadiene present as an impurity in the cracked wax feed, and incidentally demonstrate that α,ω-dienes are also useful process feeds.

In the above process example a specific feed, catalyst and organic acid medium was used. Each of these elements are members of a class.

The process is particularly useful for the conversion of $C_6$–$C_{20}$ thermally cracked wax α-olefins and α,ω-diolefin feeds, to primary alkyl chlorides. Other hydrocarbons in the $C_6$–$C_{20}$ range bearing 1 or 2 of the terminal α-olefin functional groups may also be converted to corresponding primary chlorides in the subject process. α-Olefin mixtures are also useful feed stocks. Useful feeds are representable by the general formula:

$$R'CH_2CH{=}CH_2$$

in which R' is a saturated hydrocarbon radical having from 3 to 17 carbon atoms. Any α-olefin of the above description which is distillable without appreciable loss (less than 5%) is a desirable feed for the instant process.

Representative feeds are 1-dodecene, 1-hexene, 1-eicosene, vinylcyclohexane, vinylcyclooctane, propenylbenzene, 1,7-octadiene, biallyl, 1,11-dodecadiene, and the like.

In addition to quaternary ammonium chlorides and bromides in general, lithium chloride and lithium bromide are useful catalysts. For reason of cost, tetramethyl ammonium chloride is the preferred quaternary ammonium chloride.

All thermally stable organic acids capable of existing in the liquid phase within the process hydrogen bromide displacement temperature range, that is without any appreciable thermal degradation, i.e., less than 1 percent per hour, are useful process media, including those volatile acids for which superatmospheric pressures are required in order to maintain the liquid reaction phase. Organic acids having relatively lower boiling points than the desired alkyl chloride product are preferred. Where the acd has a boiling point at least about 5° C. less than the product chloride, recovery of the latter is facilitated. Usually, less process equipment is required in this circumstance. In the absence of the organic acid, no satisfactory or appreciable production of alkyl chloride results.

In general suitable organic acids may be represented by the general formula:

$$RCO_2H$$

in which R is an inert, thermally stable hydrocarbyl radical including alkyl, cycloalkyl, phenyl, alkylphenyl naphthyl, alkylnaphthyl and the like. Acids having more than about 20 carbon atoms per molecule are undesirable for practical reasons. The lower halogen substituted organic acids are also useful process media. Thus one or more hydrogen atoms of the hydrocarbyl radical, R, of the above formula, may be replaced by a halogen of atomic number below 53. The chlorine substituted lower molecular weight organic fatty acids are particularly useful because of their increased boiling points.

Representative thermally stable organic acids are benzoic, O-toluic, p-toluic, n-toluic, t-butyl benzoic, acetic, propionic, butyric, caproic, palmitic, mono-, di-, and trichloroacetic, p-chlorobenzoic, cyclohexane carboxylic, isovaleric, valeric, 2-methylbutanoic, 3,3-dimethylbutanoic, 2,2-dimethylbutanoic, 2,3-dimethylbutanoic, stearic, p-bromobenzoic, α-naphthoic, β-naphhtoic, 2-ethylhexanoic, 2-ethylhexanoic, phenylacetic, capric and the like organic carboxylic acids.

In the hydrobromination stage, the use of catalytic free-radical generating sources in general are contemplated so long as water is neither associated in any appreciable degree therewith or appreciably produced as a result of the use thereof.

Surprisingly, the copresence of the normally reactive hydrogen chloride in large amounts in the recycle hydrogen bromide stream seems to have little or none of the expected undesired side effects such as strong acid catalyzed destruction of peroxidic catalysts, strong acid catalyzed polymerization of olefins, promotion of secondary ionic addition of halogen to olefins and the like. Therefore, any and all of the usual means employed in the art for the free-radical catalyzed addition of hydrogen bromide to α-olefins is contemplated for use in the process. Briefly, these means include the use of oxygen, organic peroxy, and azo-compounds as well as physical means such as, for example, light, γ-rays, and the like. Thus any organic peroxide or azo-compound having an appreciable rate of homolytic decomposition in the range 0 to 100° C. is useful (cf. "Organic Peroxides," A. V. Tobolsky and R. B. Mesrobian, Interscience Publishers, Inc., New York (1954)). Ultra-violet light is preferred because no catalyst decomposition fragments are involved in its use.

The selective hydrobromination is effected in the liquid phase at temperatures in the range from about 0° to 100° C., preferably from about 0° to 40° C. because, with increasingly higher temperatures, appreciable amounts of undesirable secondary alkyl bromide forms. At elevated temperatures the presence of hydrogen chloride in the hydrogen bromide-hydrogen chloride recycle gas stream appears to favor the secondary alkyl chloride formation. Substantial losses to secondary chloride formation occur above 100° C. during the hydrobromination of the olefin feed compounds.

Pressure is not a critical variable. In general the pressures in both reactors will be approximately atmospheric. Slightly elevated pressures, for example, of the order of 2–4 atmospheres are conveniently used in reactor 4 and serve to slightly improve hydrogen bromide solubility in the liquid reaction phase, and in reactor 16 moderately elevated pressures are useful in that hydrogen chloride solubilities are thereby increased. On the other hand increased pressure in reactor 16 also favors increased hydrogen bromide solubility and hence tends to slow down the desired removal of hydrogen bromide. The use of elevated pressures, i.e. of the order of 10 atmospheres and higher are undesirable because of higher pressure equipment costs.

As little as 0.1 mol of catalyst per 100 mols of organic and solvent promotes the halogen exchange. In general useful exchange rates are enjoyed when at least 1 mol of catalyst per 100 mols of solvent is used. Preferably from 5 to 10 mols or more of catalyst is desirably used per 100 mols of organic acid. At the higher reaction temperatures, relatively smaller amounts of catalyst are required for comparable rates.

The threshold temperature for the exchange reaction varies depending upon the individual alkyl bromide feed. In general, at about 130° C. an appreciable rate is found.

The rate increases with increasing temperature. Maximum useful temperatures are defined for the various feed compounds by the temperature at which thermal degradation side reactions become important. In general above about 250–300° C., depending upon the particular system involved, these effects over-balance advantages gained from increased rates from the use of incrementally higher reaction temperatures. Preferably the reaction is carried out at temperatures varying from 140° to 220° C.

The amount of the organic acid medium desirably used in the second reaction zone relative to the first reaction zone alkyl bromide charged to the second reaction zone varies. Very dilute solutions, that is of the order where the solute mol fraction is below .01 or less are undesirable because conversion rates per unit of reactor volume are impracticably low. On the other hand at least about a mol fraction of the organic acid of .25 is required in order to insure that the exchange catalyst be effective. Relative amounts of organic acid and solute intermediate the above values are in general satisfactory. The mixture of organic acid, first reaction zone product, and catalyst must be a homogeneous liquid for satisfactory operation of the process.

EXAMPLES 1–4

Using n-octyl bromide, a glass reactor fitted for stirring, introduction and withdrawal means for gas streams, and a means for temperature control, the solvents, catalysts and reaction conditions were varied as listed in the following table. The hydrogen chloride gas flow rate exceeded at all times the amount required to saturate the solution. The amount of catalyst (mol percent) based on solvent was about 5%.

TABLE

| Run No. | Solvent acid | Catalyst | Temp., ° C. | Time to 20% conversion, min. |
| --- | --- | --- | --- | --- |
| 1 | Trichloroacetic | LiCl | 185 | 365 |
| 2 | Benzoic | LiCl | 190 | 13 |
| 3 | Chloroacetic | LiCl | 175 | 45 |
| 4 | do | (CH$_3$)$_4$NCl | 150 | 25 |

EXAMPLE 5

Into a suitable reactor fitted for stirring, temperature control and irradiation by ultraviolet light (100-watt lamp) was charged to 92 g. of C$_{11}$–C$_{15}$ cut cracked wax α-olefin and 86 g. of 48% constant boiling aqueous hydrogen bromide. The resulting mixture was efficiently stirred and irradiated for 3 hours during which time the temperature of the mixture was maintained at about 38° C. The hydrocarbon was analyzed using infrared analytical techniques. No detectable addition of hydrogen bromide to olefin had taken place.

EXAMPLE 6

As in Example 5, except that 1 weight percent (based on olefin) of lauroyl peroxide was used as the free-radical initiator. No alkyl bromide was produced.

Examples 5 and 6 domonstrate that water must not be present in any appreciable amounts in the process feeds to the instant continuous primary alkyl chloride process.

What is claimed is:

1. A continuous process for the production of primary alkyl chlorides from α-olefins and hydrogen chloride in a substantially anhydrous process system having as elements thereof a first reaction zone, and a second reaction zone which comprises, introducing into said first zone an α-olefinic hydrocarbon of the formula

R'CH$_2$CH=CH$_2$ wherein R' is an alkyl radical having from 3 to 17 carbon atoms, maintaining said olefin in the liquid phase at a temperature in the range from about 0–100° C. for an average residence time in said first zone in the range of from 15–180 minutes while simultaneously introducing into said liquid olefin a gaseous mixture of hydrogen bromide and hydrogen chloride, said mixture being a composite of an effluent stream recycled from said second reaction zone and of make-up hydrogen bromide, and simultaneously catalyzing the free radical addition of the hydrogen bromide to said α-olefin during the residence time, said catalyst being selected from the group consisting of oxygen, organic peroxides, organic azo-compounds, ultra-violet light and gamma rays, thereby reducing the hydrogen bromide content of said gas mixture and producing the corresponding primary alkyl bromide; individually withdrawing from the first reaction zone said hydrogen bromide reduced gas stream and the resulting first zone reaction product and passing them individually to said second reaction zone; increasing the hydrogen bromide content of said first zone effluent gas stream by maintaining in said second reaction zone at a temperature in the range from about 130 to 300° C. for an average residence time in the range 30 to 120 minutes a liquid mixture of at least about 25 mols of an organic acid per 75 mols of said first zone product and from about 0.1 to 10 mol per 100 mols of said acid of an exchange catalyst selected from the group consisting essentially of lithium chloride, lithium bromide, tetramethylammonium bromide and tetramethylammonium chloride, while introducing said first-zone-effluent gas stream and make-up hydrogen chloride into said second reaction zone liquid mixture; passing the resulting hydrogen bromide enriched effluent gas in recycle to the first reaction zone and withdrawing from the second reaction zone the resulting reaction product mixture, and wherein said organic acid is selected from the group of the formula

RCO$_2$H wherein R is selected from the group consisting of inert hydrocarbyl radicals having less than 21 carbon atoms and the corresponding radicals having at least 1 hydrogen atom replaced by a halogen atom of atomic number below 53.

2. The process of claim 1 wherein said free-radical initiation is effected by ultraviolet light.

3. The process of claim 1 wherein said α-olefin has a boiling point at least about 5° C. above the boiling point of said organic acid and wherein said withdrawn second zone product mixture is passed to a solvent still and therein separated into an overhead solvent fraction and a bottoms crude product fraction, recycling the overhead fraction to the second reaction zone and passing the bottoms fraction to a topping still and therein separating it into an overhead unreacted hydrocarbon fraction and a concentrated crude product fraction, passing said concentrate to a product still and therein separating it into overhead n-alkyl chloride product and a final bottoms fraction, and recycling all but a minor portion of said final bottoms fraction and added make-up organic acid solvent and exchange catalyst to said second reaction zone.

4. A continuous process for the production of primary alkyl chlorides from α-olefins and hydrogen chloride in a substantially anhydrous process system having as elements thereof a first reaction zone, and a second reaction zone which comprises, introducing into said first zone an α-olefin selected from the group consisting of C$_6$–C$_{20}$ α-olefins obtained from thermally cracking hydrocarbon wax, maintaining said olefin in the liquid phase at a temperature in the range from about 0–100° C. for an average residence time in said first zone in the range of from 15–180 minutes while simultaneously introducing into said liquid olefin a gaseous mixture of hydrogen bromide and hydrogen chloride, said mixture being a composite of an effluent stream recycled from said second reaction zone and of make-up hydrogen bromide, and simultaneously irradiating said α-olefin during said residence time with ultraviolet light thereby reducing the hydrogen bromide content of said gas mixture by selectively adding the elements of hydrogen bromide to said α-olefin; individually withdrawing from the first reaction zone said hydrogen bromide reduced gas stream and the resulting first zone liquid reactor product and passing them individually to said second reaction zone; increasing the hydrogen bromide content of said first zone effluent gas steram by maintaining in said second reaction zone at a temperature in the range from about 130 to 300° C. for an average residence time in the range 30 to 120 minutes a liquid mixture of at least about 25 mols of chloracetic acid per 75 mols of said first zone product and from about 0.1 to 10 mol per 100 mols of said acid of an exchange catalyst selected from the group consisting essentially of lithium chloride, lithium bromide, tetramethylammonium bromide and tetramethylammonium chloride while introducing said first-zone effluent gas stream and takeup hydrogen chloride into said second reaction zone liquid mixture; passing the resulting hydrogen bromide enriched effluent gas in recycle to the first reaction zone and withdrawing from the second reaction zone the resulting reaction product mixture.

5. The process of claim 4 wherein said α-olefin has a boiling point at least about 5° C. above the boiling point of said organic acid and wherein said withdrawn second zone product mixture is passed to a solvent still and therein separated into an overhead solvent fraction and a bottom crude product fraction, recycling the overhead fraction to the second reaction zone and passing the bottoms fraction to a topping still and therein separating it into an overhead unreacted hydrocarbon fraction and a concentrated crude product fraction, passing said concentrate to a product still and therein separating it into overhead n-alkyl chloride product and a final bottoms fraction, and recycling all but a minor portion of said final bottoms fraction and added make-up organic acid solvent and exchange catalyst to said second reaction zone.

6. Process for the production of a primary alkyl chloride which comprises reacting in an anhydrous reaction system an alkyl bromide selected from the group consisting of primary alkyl bromides containing from about 6 to 20 carbon atoms with hydrogen chloride by dissolving said bromide and a catalyst selected from the group consisting of lithium and tetramethylammonium chlorides and bromides in an organic acid solvent of the formula $$RCO_2H$$

wherein R is selected from the group consisting of inert hydrocarbyl radicals containing less than 21 carbon atoms and the corresponding radicals having at least one hydrogen atom replaced by a chloride; maintaining the resulting solution at a temperature in the range from about 130° C. to 300° C., introducing dry hydrogen chloride gas into said solution and withdrawing the resulting effluent gas stream containing hydrogen bromide; thereby producing the corresponding primary alkyl chloride.

References Cited

UNITED STATES PATENTS

| | | | |
|---|---|---|---|
| 3,321,538 | 5/1967 | Theile et al. | 260—663 |
| 3,108,141 | 10/1963 | Gasson et al. | 260—663 |
| 3,396,204 | 8/1968 | McCarthy et al. | 260—663 |

FOREIGN PATENTS

| | | |
|---|---|---|
| 848,353 | 9/1952 | Germany. |

DANIEL D. HORWITZ, Primary Examiner

U.S. Cl. X.R.

260—663; 204—163

UNITED STATES PATENT OFFICE
CERTIFICATE OF CORRECTION

Patent No. 3,519,695           Dated July 7, 1970

Inventor(s) Shigeto Suzuki

It is certified that error appears in the above-identified patent and that said Letters Patent are hereby corrected as shown below:

Col. 3, line 62, "acd" should read --acid--

Col. 4, line 14, "β-naphhtoic" should read --β-naphthoic--

Col. 4, line 15, delete "2-ethylhexanoic" [2nd occurrence]

Claim 4, col. 7, line 7, "steram" should read --stream--

Claim 4, col. 7, line 18, "takeup" should read --make-up--

SIGNED AND SEALED
NOV 10 1970

(SEAL)
Attest:

Edward M. Fletcher, Jr.
Attesting Officer

WILLIAM E. SCHUYLER, JR.
Commissioner of Patents